United States Patent
DeHaan (10) Patent No.: US 9,047,155 B2
(45) Date of Patent: Jun. 2, 2015

(54) MESSAGE-BASED INSTALLATION MANAGEMENT USING MESSAGE BUS

(75) Inventor: Michael Paul DeHaan, Morrisville, NC (US)

(73) Assignee: Red Hat, Inc., Raleigh, NC (US)

( * ) Notice: Subject to any disclaimer, the term of this patent is extended or adjusted under 35 U.S.C. 154(b) by 1070 days.

(21) Appl. No.: 12/495,077

(22) Filed: Jun. 30, 2009

(65) Prior Publication Data

US 2010/0333084 A1  Dec. 30, 2010

(51) Int. Cl.
G06F 9/445 (2006.01)

(52) U.S. Cl.
CPC ........................................ *G06F 8/61* (2013.01)

(58) Field of Classification Search
None
See application file for complete search history.

(56) References Cited

U.S. PATENT DOCUMENTS

| | | | |
|---|---|---|---|
| 5,787,246 A | 7/1998 | Lichtman et al. | |
| 5,835,719 A | 11/1998 | Gibson et al. | |
| 5,948,062 A | 9/1999 | Tzelnic et al. | |
| 6,105,100 A | 8/2000 | Dean et al. | |
| 6,212,585 B1 | 4/2001 | Chrabaszcz | |
| 6,243,747 B1 | 6/2001 | Lewis et al. | |
| 6,266,809 B1 * | 7/2001 | Craig et al. | 717/173 |
| 6,272,536 B1 | 8/2001 | van Hoff et al. | |
| 6,381,742 B2 | 4/2002 | Forbes et al. | |
| 6,415,289 B1 | 7/2002 | Williams et al. | |
| 6,438,711 B2 | 8/2002 | Woodruff | |
| 6,516,427 B1 | 2/2003 | Keyes et al. | |
| 6,526,442 B1 | 2/2003 | Stupek et al. | |
| 6,550,021 B1 | 4/2003 | Dalphy et al. | |
| 6,557,169 B1 | 4/2003 | Erpeldinger | |
| 6,594,664 B1 | 7/2003 | Estrada et al. | |
| 6,625,742 B1 | 9/2003 | Owhadi et al. | |
| 6,686,638 B2 | 2/2004 | Rezvani et al. | |
| 6,751,659 B1 | 6/2004 | Fenger et al. | |
| 6,757,837 B1 | 6/2004 | Platt et al. | |
| 6,769,022 B1 | 7/2004 | DeKoning et al. | |
| 6,779,004 B1 | 8/2004 | Zintel | |
| 6,845,464 B2 | 1/2005 | Gold | |
| 6,865,737 B1 | 3/2005 | Lucas et al. | |
| 6,947,939 B2 | 9/2005 | Fujibayashi et al. | |
| 6,986,033 B2 | 1/2006 | Miyamoto et al. | |
| 7,013,461 B2 * | 3/2006 | Hellerstein et al. | 717/177 |
| 7,051,101 B1 | 5/2006 | Dubrovsky et al. | |
| 7,107,330 B1 | 9/2006 | Hamilton et al. | |
| 7,133,822 B1 | 11/2006 | Jacobson | |
| 7,165,109 B2 | 1/2007 | Chiloyan et al. | |
| 7,185,071 B2 | 2/2007 | Berg et al. | |
| 7,200,845 B2 | 4/2007 | Morrison et al. | |
| 7,293,169 B1 * | 11/2007 | Righi et al. | 713/2 |
| 7,340,637 B2 | 3/2008 | Nagoya | |
| 7,350,112 B2 | 3/2008 | Fox et al. | |

(Continued)

OTHER PUBLICATIONS

HP Storage Essentials SRM 6.0 Installation Guide. Jan. 2008. HP. 1st ed. Part No. T4283-96113. pp. 1-5, 97-136, 219-228.

(Continued)

*Primary Examiner* — Kris Rhu
(74) *Attorney, Agent, or Firm* — Lowenstein Sandler LLP (57) ABSTRACT

Embodiments relate to message-based installation management using a message bus. In embodiments, a deployment server or other provisioning host can be connected to a resource via a message bus. A processor monitors the bus message traffic to detect a message activity. The processor generates an installation command to cause a software installation in a managed network in view of the message activity detected on the message bus.

22 Claims, 4 Drawing Sheets

(56) References Cited

U.S. PATENT DOCUMENTS

| | | |
|---|---|---|
| 7,356,679 B1 | 4/2008 | Le et al. |
| 7,395,322 B2 | 7/2008 | Harvey et al. |
| 7,506,040 B1 | 3/2009 | Rabe et al. |
| 7,506,151 B2 | 3/2009 | Miyamoto et al. |
| 7,516,218 B2 | 4/2009 | Besson |
| 7,519,691 B2 | 4/2009 | Nichols et al. |
| 7,574,481 B2 | 8/2009 | Moore et al. |
| 7,600,005 B2 | 10/2009 | Jamkhedkar et al. |
| 7,606,868 B1 | 10/2009 | Le et al. |
| 7,640,325 B1 | 12/2009 | DeKoning et al. |
| 7,681,080 B2 | 3/2010 | Abali et al. |
| 7,716,316 B2 | 5/2010 | Nichols et al. |
| 7,734,717 B2 | 6/2010 | Saarimaki et al. |
| 7,827,261 B1 | 11/2010 | Griswold et al. |
| 7,831,997 B2 | 11/2010 | Eldar et al. |
| 7,937,437 B2 | 5/2011 | Fujii |
| 2002/0062259 A1 | 5/2002 | Katz et al. |
| 2002/0078186 A1 | 6/2002 | Engel et al. |
| 2002/0138567 A1 | 9/2002 | Ogawa |
| 2002/0162028 A1 | 10/2002 | Kennedy |
| 2003/0005097 A1 | 1/2003 | Barnard et al. |
| 2003/0055919 A1 | 3/2003 | Fong et al. |
| 2003/0069884 A1 | 4/2003 | Nair et al. |
| 2003/0069946 A1 | 4/2003 | Nair et al. |
| 2003/0070110 A1 | 4/2003 | Aija et al. |
| 2003/0074549 A1 | 4/2003 | Paul et al. |
| 2003/0110173 A1 | 6/2003 | Marsland |
| 2003/0119480 A1 | 6/2003 | Mohammed |
| 2003/0126585 A1 | 7/2003 | Parry |
| 2003/0195921 A1 | 10/2003 | Becker et al. |
| 2003/0200272 A1* | 10/2003 | Campise et al. ............... 709/206 |
| 2003/0212992 A1 | 11/2003 | Ronning et al. |
| 2004/0006616 A1 | 1/2004 | Quinn et al. |
| 2004/0015831 A1 | 1/2004 | Bowhill |
| 2004/0015957 A1 | 1/2004 | Zara et al. |
| 2004/0019876 A1 | 1/2004 | Dravida et al. |
| 2004/0024984 A1 | 2/2004 | Lanzatella et al. |
| 2004/0044643 A1 | 3/2004 | deVries et al. |
| 2004/0054789 A1 | 3/2004 | Breh et al. |
| 2004/0059703 A1 | 3/2004 | Chappell et al. |
| 2004/0064501 A1 | 4/2004 | Jan et al. |
| 2004/0128375 A1 | 7/2004 | Rockwell |
| 2004/0143664 A1 | 7/2004 | Usa et al. |
| 2004/0167975 A1 | 8/2004 | Hwang et al. |
| 2004/0215755 A1 | 10/2004 | O'Neill |
| 2004/0223469 A1 | 11/2004 | Bahl et al. |
| 2004/0243996 A1* | 12/2004 | Sheehy et al. ............... 717/174 |
| 2005/0028025 A1 | 2/2005 | Zalewski et al. |
| 2005/0050175 A1 | 3/2005 | Fong et al. |
| 2005/0114474 A1 | 5/2005 | Anderson et al. |
| 2005/0125525 A1 | 6/2005 | Zhou et al. |
| 2005/0177829 A1 | 8/2005 | Vishwanath |
| 2005/0182796 A1 | 8/2005 | Chu et al. |
| 2005/0198629 A1 | 9/2005 | Vishwanath |
| 2005/0223374 A1 | 10/2005 | Wishart et al. |
| 2006/0041767 A1 | 2/2006 | Maxwell et al. |
| 2006/0080659 A1 | 4/2006 | Ganji |
| 2006/0095230 A1 | 5/2006 | Grier et al. |
| 2006/0095702 A1 | 5/2006 | Hickman et al. |
| 2006/0155857 A1 | 7/2006 | Feenan et al. |
| 2006/0168581 A1* | 7/2006 | Goger et al. ............... 717/174 |
| 2006/0173912 A1 | 8/2006 | Lindvall et al. |
| 2006/0174018 A1 | 8/2006 | Zhu et al. |
| 2006/0190575 A1 | 8/2006 | Harvey et al. |
| 2006/0190773 A1 | 8/2006 | Rao et al. |
| 2006/0200658 A1 | 9/2006 | Penkethman |
| 2006/0215575 A1 | 9/2006 | Horton et al. |
| 2006/0218544 A1 | 9/2006 | Chakraborty et al. |
| 2006/0230165 A1 | 10/2006 | Zimmer et al. |
| 2006/0282479 A1 | 12/2006 | Johnson et al. |
| 2007/0015538 A1 | 1/2007 | Wang |
| 2007/0067419 A1 | 3/2007 | Bennett |
| 2007/0101118 A1 | 5/2007 | Raghunath et al. |
| 2007/0118654 A1 | 5/2007 | Jamkhedkar et al. |
| 2007/0168721 A1 | 7/2007 | Luiro et al. |
| 2007/0169093 A1 | 7/2007 | Logan et al. |
| 2007/0192158 A1 | 8/2007 | Kim |
| 2007/0204338 A1 | 8/2007 | Aiello et al. |
| 2007/0226810 A1 | 9/2007 | Hotti |
| 2007/0244996 A1 | 10/2007 | Ahmed et al. |
| 2007/0276905 A1 | 11/2007 | Durand et al. |
| 2007/0288612 A1 | 12/2007 | Hall |
| 2007/0294376 A1 | 12/2007 | Ayachitula et al. |
| 2007/0299951 A1 | 12/2007 | Krithivas |
| 2008/0028048 A1 | 1/2008 | Shekar et al. |
| 2008/0040452 A1 | 2/2008 | Rao et al. |
| 2008/0046708 A1 | 2/2008 | Fitzgerald et al. |
| 2008/0059959 A1 | 3/2008 | Chen et al. |
| 2008/0130639 A1 | 6/2008 | Costa-Requena et al. |
| 2008/0148409 A1* | 6/2008 | Ampunan et al. ............... 726/26 |
| 2008/0168424 A1* | 7/2008 | Mohindra et al. ............... 717/120 |
| 2008/0172664 A1* | 7/2008 | Nduaguba et al. ............... 717/174 |
| 2008/0189693 A1 | 8/2008 | Pathak |
| 2008/0196043 A1 | 8/2008 | Feinleib et al. |
| 2008/0235266 A1 | 9/2008 | Huang et al. |
| 2008/0235361 A1 | 9/2008 | Crosbie et al. |
| 2008/0244325 A1 | 10/2008 | Tyulenev |
| 2008/0270674 A1 | 10/2008 | Ginzton |
| 2008/0288938 A1 | 11/2008 | DeHaan |
| 2008/0288939 A1 | 11/2008 | DeHaan |
| 2008/0294777 A1 | 11/2008 | Karve et al. |
| 2008/0301666 A1 | 12/2008 | Gordon et al. |
| 2008/0313716 A1 | 12/2008 | Park |
| 2008/0320110 A1 | 12/2008 | Pathak |
| 2009/0007091 A1 | 1/2009 | Appiah et al. |
| 2009/0055901 A1 | 2/2009 | Kumar et al. |
| 2009/0064132 A1 | 3/2009 | Suchy et al. |
| 2009/0089567 A1 | 4/2009 | Boland et al. |
| 2009/0089852 A1 | 4/2009 | Randolph et al. |
| 2009/0106291 A1 | 4/2009 | Ku et al. |
| 2009/0129597 A1 | 5/2009 | Zimmer et al. |
| 2009/0132682 A1 | 5/2009 | Counterman |
| 2009/0132710 A1 | 5/2009 | Pelley |
| 2009/0158148 A1 | 6/2009 | Vellanki et al. |
| 2009/0158272 A1 | 6/2009 | El-Assir et al. |
| 2009/0164522 A1 | 6/2009 | Fahey |
| 2009/0165099 A1 | 6/2009 | Eldar et al. |
| 2009/0172430 A1 | 7/2009 | Takenouchi |
| 2009/0217163 A1* | 8/2009 | Jaroker ............... 715/700 |
| 2009/0240835 A1 | 9/2009 | Adelman et al. |
| 2009/0259665 A1 | 10/2009 | Howe et al. |
| 2009/0265707 A1 | 10/2009 | Goodman et al. |
| 2009/0282404 A1 | 11/2009 | Khandekar et al. |
| 2009/0285199 A1 | 11/2009 | Strahs et al. |
| 2010/0023740 A1 | 1/2010 | Moon et al. |
| 2010/0049838 A1 | 2/2010 | DeHaan |
| 2010/0050169 A1 | 2/2010 | DeHaan |
| 2010/0054156 A1 | 3/2010 | DeHaan |
| 2010/0057390 A1 | 3/2010 | DeHaan |
| 2010/0057833 A1 | 3/2010 | DeHaan |
| 2010/0057913 A1 | 3/2010 | DeHaan |
| 2010/0057930 A1 | 3/2010 | DeHaan |
| 2010/0058307 A1 | 3/2010 | DeHaan |
| 2010/0058327 A1 | 3/2010 | DeHaan |
| 2010/0058328 A1 | 3/2010 | DeHaan |
| 2010/0058330 A1 | 3/2010 | DeHaan |
| 2010/0058332 A1 | 3/2010 | DeHaan |
| 2010/0058444 A1 | 3/2010 | DeHaan |
| 2010/0082799 A1 | 4/2010 | DeHaan et al. |
| 2010/0083245 A1 | 4/2010 | DeHaan et al. |
| 2010/0100876 A1 | 4/2010 | Glover et al. |
| 2010/0128639 A1 | 5/2010 | DeHaan et al. |
| 2010/0131646 A1 | 5/2010 | Drako |
| 2010/0138521 A1 | 6/2010 | DeHaan et al. |
| 2010/0138526 A1 | 6/2010 | DeHaan et al. |
| 2010/0138696 A1 | 6/2010 | DeHaan et al. |
| 2010/0217837 A1 | 8/2010 | Ansari et al. |
| 2010/0217840 A1 | 8/2010 | DeHaan et al. |
| 2010/0217843 A1 | 8/2010 | DeHaan et al. |
| 2010/0217848 A1 | 8/2010 | DeHaan et al. |
| 2010/0217944 A1 | 8/2010 | DeHaan et al. |
| 2010/0218243 A1 | 8/2010 | DeHaan et al. |
| 2010/0220584 A1 | 9/2010 | DeHaan et al. |
| 2010/0223367 A1 | 9/2010 | DeHaan |

(56) References Cited

U.S. PATENT DOCUMENTS

| | | | |
|---|---|---|---|
| 2010/0223504 | A1 | 9/2010 | DeHaan et al. |
| 2010/0223607 | A1 | 9/2010 | DeHaan |
| 2010/0223608 | A1 | 9/2010 | DeHaan et al. |
| 2010/0223609 | A1 | 9/2010 | DeHaan et al. |
| 2010/0223610 | A1 | 9/2010 | DeHaan et al. |
| 2010/0281456 | A1* | 11/2010 | Eizenman et al. ............ 717/104 |

OTHER PUBLICATIONS

HP Storage Essentials SRM 6.0 User Guide. Jan. 2008. HP 1st ed. Part number: T4238-96114. pp. 1-83.
Michael DeHaan. "Unfiled Provisioning". 2007.
Michael DeHaan. "Provisioning With Cobbler". 2007.
Tan et al. "A WBEM Basked Disk Array Management Provider". 2005. IEEE. 2005 International Conference on Cyberworlds.
Lovelace et al. Managing Disk Subsystems using IBM TotalStorage Productivity Center. Sep. 2005. IBM. 2nd ed. SG24-7097-01. pp. 1-42.
Doc Searls "Linux for Suits", 2005, Specialized System Consultants Inc., vol. 2005.
eBook "Microsoft System Management Server 2003 Administrator's companion", Microsoft Press, c2004, Ch. 13, Patch Management, pp. 471-507.
Butt et al., "Automated Installation of Large-Scale Linux Networks", 2000.
Agarwalla, "Automating Provisioning of Complete Software Stack in a Grid Environment", 2004.
Anderson et al., "Technologies for Large-Scale Configuration Management", Dec. 9, 2002.
Grosse, "Repository Mirroring", 1995.
Michael DeHaan, "Methods and Systems for Provisioning Software", U.S. Appl. No. 11/763,315, filed Jun. 14, 2007.
Michael DeHaan, "Methods and Systems for Provisioning Software", U.S. Appl. No. 11/763,333, filed Jun. 14, 2007.
DeHaan, "Systems and Methods for Cloning Target Machines in a Software Provisioning Environment", U.S. Appl. No. 12/473,014, filed May 27, 2009.
DeHaan, "Systems and Methods for Providing Configuration Management Services from a Provisioning Server", U.S. Appl. No. 12/414,941, filed Mar. 31, 2009.
DeHaan, "Systems and Methods for Retiring Target Machines by a Provisioning Server", U.S. Appl. No. 12/475,427, filed May 29, 2009.
Henson, "Systems and Methods for Mounting Specified Storage Resources from Storage Area Network in Machine Provisioning Platform", U.S. Appl. No. 12/627,988, filed Nov. 30, 2009.
Henson, "Systems and Methods for Integrating Storage Resources from Storage Area Network in Machine Provisioning Platform", U.S. Appl. No. 12/628,041, filed Nov. 30, 2009.

* cited by examiner

MESSAGE-BASED INSTALLATION MANAGEMENT USING MESSAGE BUS

FIELD

The present teachings relate to systems and methods for message-based installation management using a message bus, and more particularly to platforms and techniques for initiating, monitoring, and managing installation events generated by a deployment server connected to applications, targets, and other resources in a managed network via a message bus.

BACKGROUND OF RELATED ART

Distribution servers and other deployment platforms are available for managed network applications which configure the distribution of software to target machines on a network-wide basis. In available deployment platforms, a distribution server can be set up to communicate with the target machines or other nodes of a managed network, and initiate the delivery and installation of software to those nodes. In cases, the provisioning may be the original operating system installation for a new machine, or may be software updates, including operating system or application updates, to existing targets or other hardware.

In conventional deployment platforms, the distribution server can act as a repository for the software images needed for software installations, and communicate with the target machines via application programming interfaces (APIs) and connections to supervisory hosts or target machines which are prepared to receive the installation. However, deployment platforms as currently implemented can involve certain drawbacks or limitations. For one, in general for existing deployment platforms to conduct installation activity, a set of messages must be sent on a point-to-point basis between some type of provisioning server and recipient hosts or targets. That is, installation events depend and take place based on positive communication events between deployment servers and nodes in the managed network. There is no capability in such networks for the ongoing monitoring or surveillance of all installation-related activity. As a result, for example, applications or application servers or other entities which may wish to prepare an installation package for newly-installed machines may not become aware of the existence of newly instantiated machines until a separate command arrives addressed to them that notifies them of that event. For another, in general existing deployment platforms rely upon a set of installation-related commands called via a defined API, which requires that all participating targets and other nodes in the network be configured to interpret that API. As a result, clients, devices, or other machines introduced into the managed network that do not host that API may be unable to receive installation-related services. It may be desirable to provide methods and systems for message-based installation management using a message bus, in which provisioning requests and events can be deployed as universal services across a managed network.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for message-based installation management using a message bus. More particularly, embodiments related to platforms and techniques for monitoring a message bus connected between a deployment server, managed network, set of applications, and other resources to detect the occurrence of installation events, such as the installation of an operating system and/or the instantiation of a virtual machine.

When installation events occur, applications or other logic can generate additional messaging to initiate further installation sequences, or to cause other provisioning, configuration, or management activity in the target machines. In embodiments, applications, network management platforms, and other network entities can likewise generate installation-related message commands that do not depend on detection of an in-process installation event, such as periodic software updates or refreshes. Because applications and other logic can subscribe to or monitor the installation-related traffic taking place on the message bus, installation services can be flexibly configured amongst multiple nodes and resources, without a need for point-to-point calls relying upon programmatic API commands. These and other embodiments described herein address the various noted shortcomings in known provisioning technology, and provide a user or network operator with enhanced installation services.

Reference will now be made in detail to exemplary embodiments of the present teachings, which are illustrated in the accompanying drawings. Where possible the same reference numbers will be used throughout the drawings to refer to the same or like parts.

Figure 1:
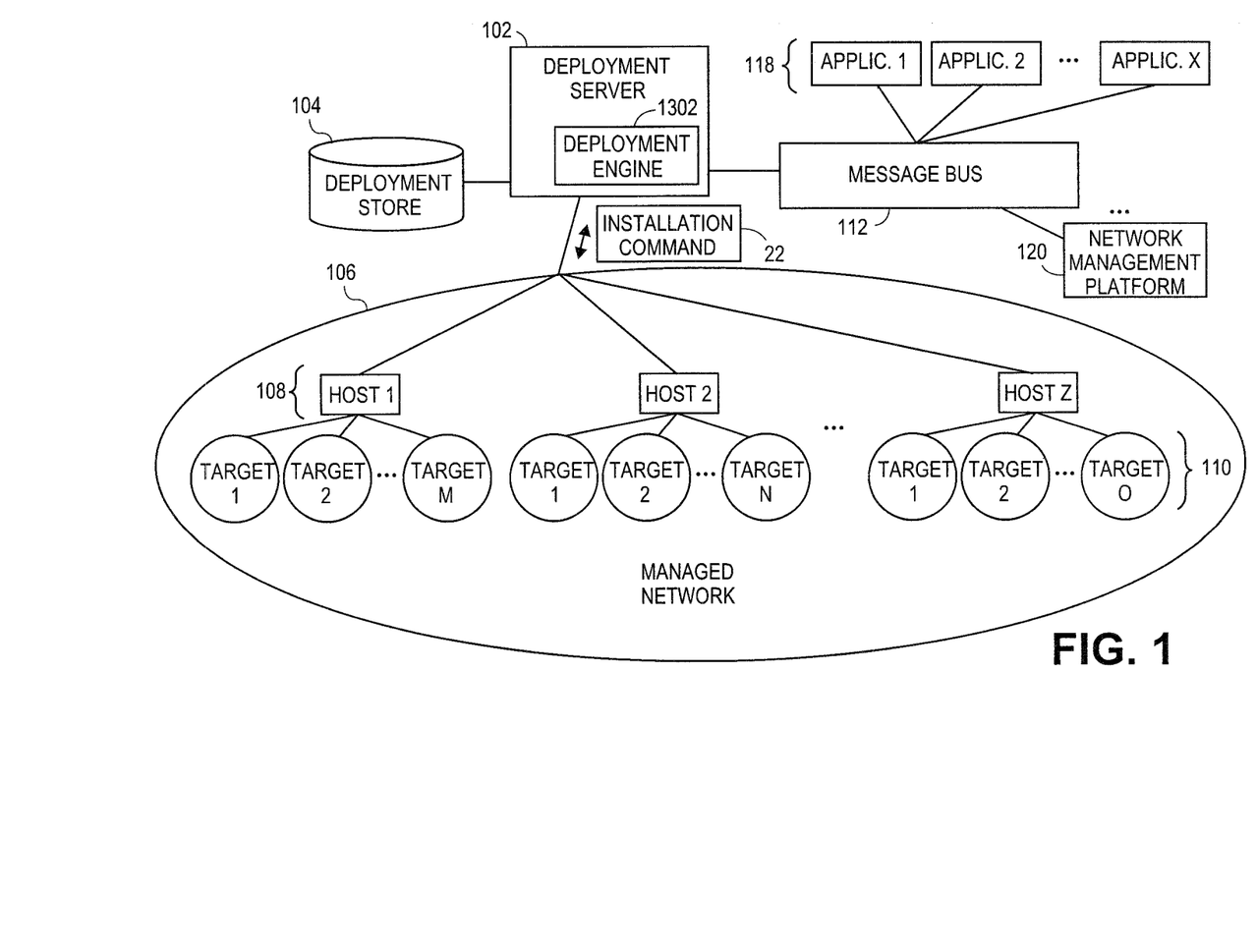
FIG. 1 illustrates an overall network in which systems and methods for message-based installation management using a message bus can be implemented, according to various embodiments.

FIG. 1 illustrates an overall network 100 in which systems and methods for message-based installation management using a message bus can be implemented, according to various embodiments of the present teachings. In embodiments as shown, a deployment server 102 can communicate with a managed network 106 to carry out various installation, provisioning, deployment, or associated services. In embodiments, deployment serve 102 can communicate with managed network 106 via secure or non-secure channels or connections, including, for instance, the Internet or other public or private networks. In embodiments, deployment server 102 can host, maintain, or communicate with a set of associated resources including a deployment store 104, which can be or include a local or remote database or data store hosting installation code, scripts, tables, profiles, authentication data, and other data or resources related to installation activity in managed network 106 or other networks or destinations. In embodiments, deployment server 102 can be or include a server, platform, and/or related resources such as those described in copending U.S. patent application Ser. No. 11/763,315, U.S. Patent Application Publication No. 2008/0288938 and U.S. patent application Ser. No. 11/763,333, U.S. Patent Publication No. 2008/0288939, the disclosures of which are incorporated herein, in their entirety, by reference. In embodiments, deployment server 102 can comprise, host, or access a deployment engine 132 containing applications, logic, and/or other resources to generate, filter, route, and manage installation-related messages, commands, and/or data to managed network 106.

Managed network 106 can include or host a set of resources including a set of hosts 108, a set of targets 110, and/or other nodes, machines, or resources. In embodiments, either of set of hosts 108, set of targets 110, and/or other nodes or resources of managed network 106 can be or include virtual machines, as well as hardware-based or hardware-implemented machines. In embodiments, set of hosts, set of targets 110, and/or other resources of managed network 106 can be or include resources instantiated from or based on cloud-based networks.

In embodiments as likewise shown, deployment server 102 as well as other resources or entities can be connected to, or communicate with, a message bus 112. In embodiments, message bus 112 can be exposed to deployment server, managed network 106, and/or other nodes or resources on a direct basis without a necessity for an intermediate application programming interface (API). In embodiments, message bus 112 can be or include a message bused based on the Advanced Message Queuing Protocol (AMQP). In embodiments message bus 112 can be or include, for instance, the Red Hat Enterprise MRG platform implementing an AMQP-based message bus, available from Red Hat Inc., Raleigh, N.C. Other AMQP-based or other message bus architectures can be used. In general, message bus 112 can receive and publish messages on a many-to-many, one-to-many, or other distribution basis.

In embodiments as shown, message bus 112 also be connected to or communicate with a set of applications 118, such as supervisory, management, communications, and/or other applications. Set of applications 118 can in embodiments be hosted or execute in associated servers or other hosts. Message bus 112 can further be connected to one or more network management platform 120, such as a network controller or network security server. Other nodes, servers, entities, services, or resources can be connected or registered to message bus 112, which again, can configured to receive messages or commands from all connected entities without invoking any specific application programming interface (API), and/or without requiring structured or rigidly structured message formats.

In terms of installation management, in embodiments as shown set of applications 118, one or more network management platform 120, and/or other services or resources can subscribe to message bus 112 and monitor message traffic over that bus to detect installation events that may be initiated by or via deployment server 102. For example, set of applications 118 can detect the initiation of installation processes conducted on a set of virtual machine as part of set of targets 110. The installation activity can be identified, for instance, by the type of instructions or data being passed from deployment server 102 to set of targets 110 or other destination. Upon detection of an installation event, one or more application in set of applications 118 can transmit one or more installation command 122 to deployment server 102 based on the detected installation activity. In embodiments, for instance, one or more application in set of applications 118 can transmit one or more installation command 122 to deployment server 102 indicating that a set of applications, such as database or messaging applications, should be installed upon completion of the operating system installation in set of hosts 108 and/or set of targets 110. One or more installation command 122 can then be communicated, or associated commands or installations can be executed, on the desired node, resource, or machine in managed network 106. In embodiments, other applications in set of applications 118, one or more network management platform 120, and/or other resources can similarly transmit one or more installation command 122 to deployment server 102, for instance, in response to an original installation event. In embodiments, one or more installation command can also or instead be transmitted from set of applications 118, one or more network management platform 120, and/or other resources at other times or based on other conditions which may or may not be based on installation events. For instance, one or more applications in set of applications 118 can transmit one or more installation command 122 to deployment server 102 based on a predetermined schedule, for instance, to update installed applications on a regular basis. Other conditions can be used. For instance, one or more installation command 122 can be triggered by the detection of message activity on message bus 112 from other applications in set of applications 118, for instance, to generate a succession of software installations to set of hosts 108, set of targets 110, and/or other nodes or destinations, in dependency order. Other triggering events or message criteria can be used.

Figure 2:
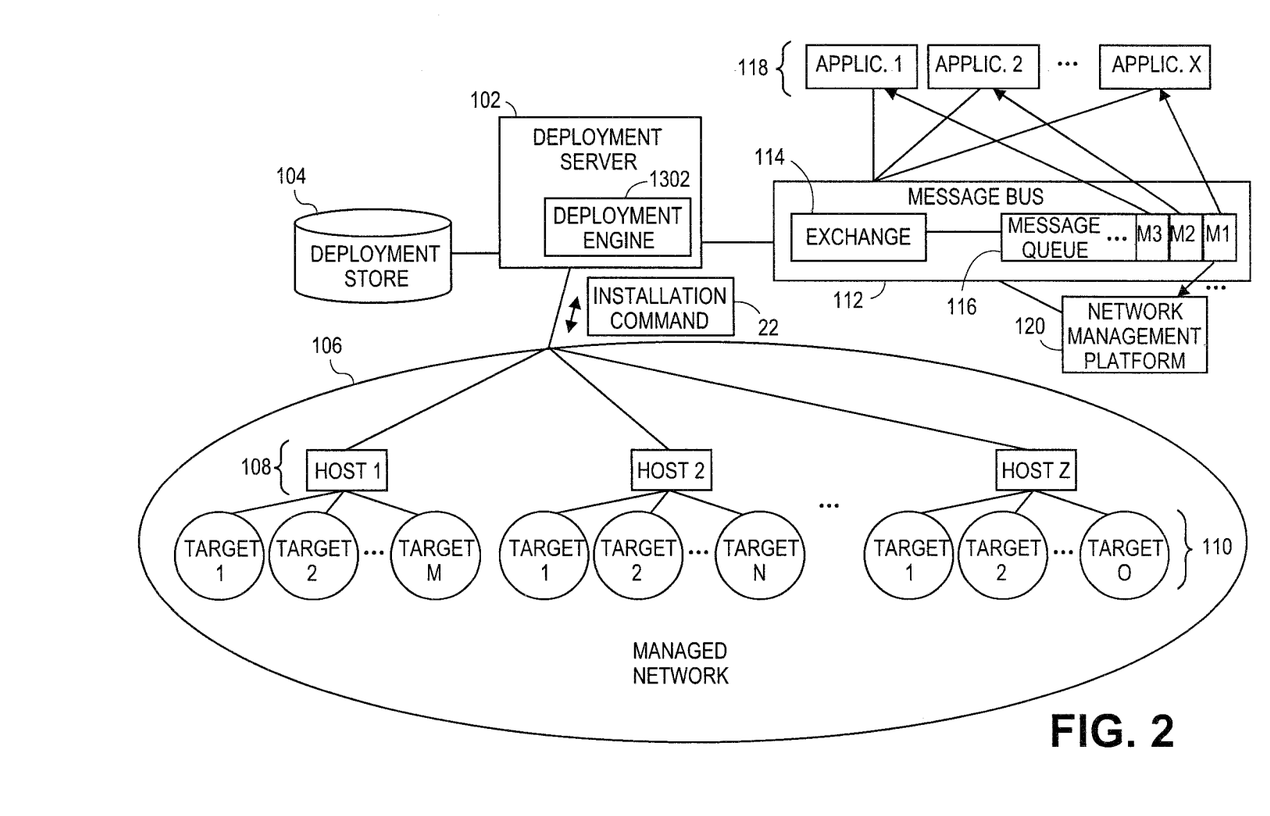
FIG. 2 illustrates an overall network in which systems and methods for message-based installation management using a message bus can implemented, according to various embodiments in further regards.
Figure 4:
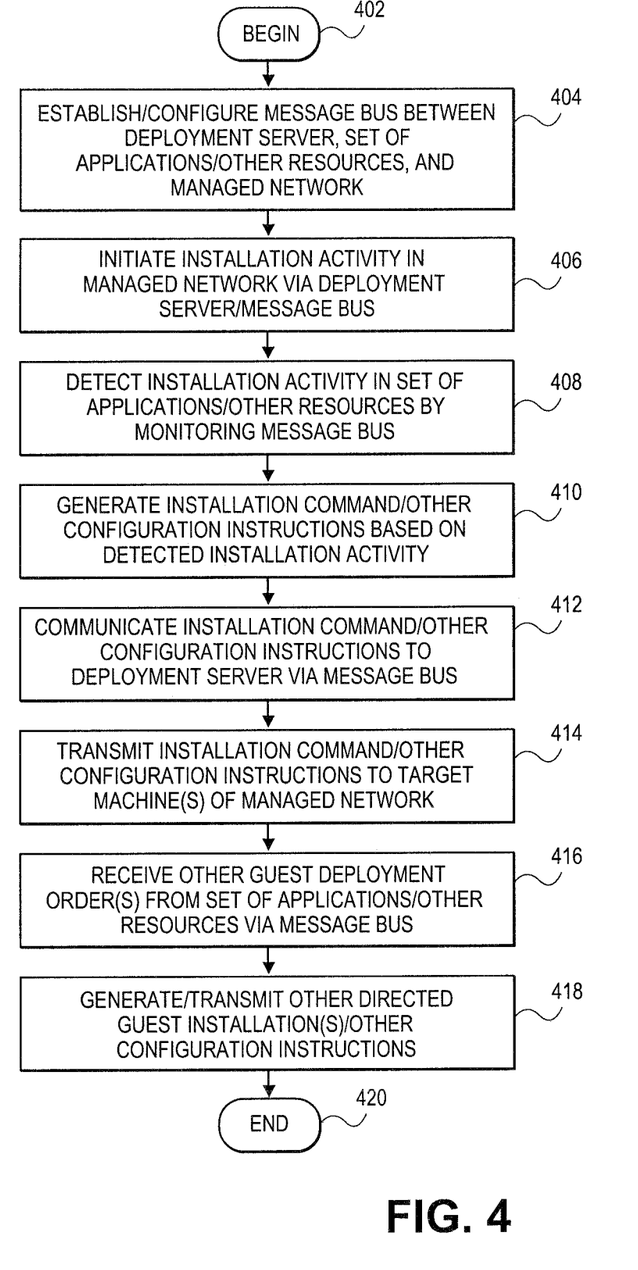
FIG. 4 illustrates a flowchart of installation processing that can be used in systems and methods for message-based installation management using a message bus, according to various embodiments.

More particularly, and as for example shown in FIG. 4, deployment server 102 can be connected to and communicate with managed network 106, set of applications 118, network management platform 120, and/or other nodes or resources via message bus 112. In embodiments, message bus 112 can comprise an exchange 112, such as a server or other resource, to which messages from any participating node or other source can be transmitted. Exchange 112 can comprise logic to receive message traffic from deployment server 102, set of applications 118, network management platform 120, and/or other nodes or resources and insert received messages into one or more message queue 116. Message queue 116 can temporarily store message traffic and delivery messages to destination nodes or resources including deployment server 102, set of applications 118, one or more management platform 120, and managed network 106 along with any of its constituent nodes. In embodiments, for example, any or more of set of applications 118 can subscribe to message events generated by deployment server 102 and transmitted to, for instance, set of hosts 108 and/or set of targets 110. In embodiments, nodes or other resources which monitor message traffic communicated by way of exchange 114 can registered to receive that traffic on a subscription or other basis, so that those recipients can monitor ongoing message flows without a need to communicate via an API or other programmatic interface. Upon detection of predetermined message events or at other times, set of applications 118 and/or other nodes or entities can transmit one or more installation command 122 to deployment server 102. One or more installation command 122 can likewise be communicated via message bus 112, including exchange 114, one or more message queue 116, and/or other resources, interfaces, or facilities associated with message bus 112. While embodiments are shown in which message bus 112 contains at least one exchange 112 and one or more message queue 116, it will be appreciated that other communications resources and architectures can be used by or hosted in message bus 112. It may be further noted that one or more installation command 122, as well as other message types or content, can be transmitted via message bus 122 in various configurations. For instance, a message transmitted to message bus 112 can, for instance, be sent to one destination from one source, to multiple destinations from one source, from multiple destinations from one source, and/or multiple destinations from multiple sources. One or more installation command 122 and/or other message traffic can likewise be transmitted from one or more sources to one or more destinations in sequence, in daisy-chain fashion.

Figure 3:
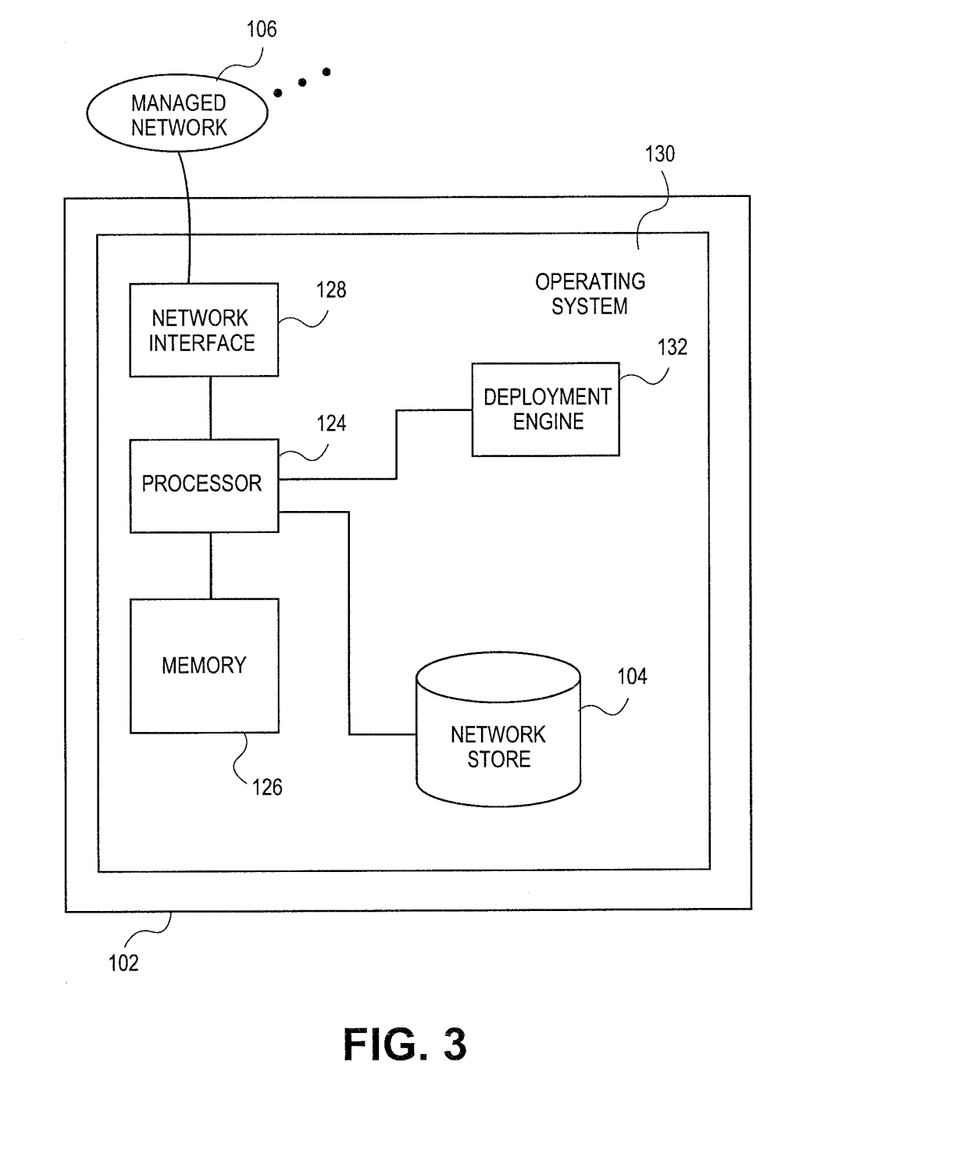
FIG. 3 illustrates an exemplary hardware configuration of a deployment server and associated resources, according to various embodiments.

FIG. 3 illustrates an exemplary diagram of hardware and other resources that can be incorporated in a deployment server 102 configured to communicate with managed network 106 including set of hosts 108, set of target 110, message bus 112, and/or other resources, according to embodiments. In embodiments as shown, the deployment server 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with a deployment store 104, such as a database stored on a local hard drive. Processor 124 further communicates with network interface 128, such as an Ethernet or wireless data connection, which in turn communicates with one or more managed network 106, which can be, include, or be accessed with via private or secure channels, and/or the Internet or other public or private networks. Processor 124 also communicates with deployment engine 132 and/or other resources or logic, to execute control, messaging, installation, and other management processes described herein. Other configurations of the deployment server 102, associated network connections, and other hardware and software resources are possible. While FIG. 3 illustrates deployment server 102 as a standalone system comprises a combination of hardware and software, deployment server 102 can also be implemented as a software application or program capable of being executed by a conventional computer platform. Likewise, deployment server 102 can also be implemented as a software module or program module capable of being incorporated in other software applications and programs. In either case, deployment server 102 can be implemented in any type of conventional proprietary or open-source computer language.

FIG. 4 illustrates a flowchart of overall processing that can be used in systems and methods for message-based installation management using a message bus, according to various embodiments. In 402, processing can begin. In 404, message bus 112 can be established and/or configured between deployment server 102, set of applications 118, management platform 120, and/or other resources, and managed network 106. In 406, installation activity in managed network 106 can be initiated via deployment server 102, message bus 112, and targets or other resources of managed network 106. In embodiments, the installation activity can be or include operating system, application, or other installations to set of hosts 108, set of targets 110, and/or other clients, devices, and/or resources of managed network 106. In 408, set of applications 118, management platform 120, and/or other entities or resources can detect the installation activity conducted by deployment server 102 by monitoring message bus 112, and for instance detecting commands indicating or representing the initiation or execution of installation, provisioning, or other activities.

In 410, set of applications 118, management platform 120, and/or other entities or resources can generate one or more installation command 122 based on the detected installation activity taking place over message bus 112. For instance, upon detection of the installation of operating system software on a given subset of set of targets 110, set of applications 118 can initiate the installation of identified application software, communication services, and/or other software or services. In 412, the set of applications 118, management platform 120, or other entity or resources can communicate the resulting one or more installation command 122 to deployment server 102 via message bus 112. In 414, deployment server 102 can transmit the one or more installation command 122 and/or other configuration instructions to one or more target machine in managed network 106, such as one or more servers of other hosts in set of hosts 108, and/or one or more clients or other targets in set of targets 110.

In 416, deployment server 102 can receive one or more other installation command 122 or other guest deployment order from set of applications 118, management platform 120, and/or other entities or resources via message bus 112. For instance, an application in set of applications 118 may direct the installation of a set of applications that are not associated or directly associated with an installation event, such as installations based on periodic software updates or patches. In 418, deployment server 102 can generate and/or transmit the additional one or more installation command 122 or other directed guest installation(s) or configuration instructions to target machines or resources in managed network 106. In 420, processing can repeat, return to a prior processing point, jump to a further processing point, or end.

The foregoing description is illustrative, and variations in configuration and implementation may occur to persons skilled in the art. For example, while embodiments have been described which operate in a network incorporating one deployment server 102 communicating with managed network 106, set of applications 118 and other resources via one message bus 112, in embodiments, more than one deployment server or host can be used. Likewise, in embodiments more than one message bus can be implemented to provide communications between one or more deployment servers, applications, target machines, and/or other resources. Other resources described as singular or integrated can in embodiments be plural or distributed, and resources described as multiple or distributed can in embodiments be combined. The scope of the present teachings is accordingly intended to be limited only by the following claims.

What is claimed is:

1. A method, comprising:
establishing a message bus between a deployment server and a resource;
monitoring, by a processor, the message bus to detect a first installation activity; and
generating by the processor, an installation command to cause a second installation activity in a managed network in view of the first installation activity detected on the message bus.

2. The method of claim 1, wherein the managed network comprises at least one of a set of hosts or a set of targets.

3. The method of claim 2, wherein the at least one of a set of hosts or a set of targets comprises at least one of a set of virtual machines or a set of hardware-implemented machines.

4. The method of claim 3, wherein the first installation activity comprises a first software installation to a plurality of the hosts or targets in the at least one of a set of hosts or a set of targets.

5. The method of claim 1, wherein at least one of the deployment server, an application, or a node of the managed network subscribe to a message queue.

6. The method of claim 5, further comprising generating a message from the deployment server to at least one of the application or node of the managed network indicating a status of an installation process.

7. The method of claim 5, wherein the subscription to the message queue is based on a one-to-many configuration.

8. The method of claim 1, wherein the resource comprises an application, the managed network, and a network management platform.

9. The method of claim 1, wherein the first installation activity comprises an installation an operating system, and wherein the second installation activity comprises an installation of a set of software applications to the operating system.

10. The method of claim 1, wherein the first installation activity in the managed network is deployed as a universal service across the managed network.

11. A system, comprising:
an interface to a resource; and
a deployment server, to communicate with the resource via the interface, the deployment server comprising a processor to:
access a message bus between the deployment server and the resource to detect a message activity that is related to an installation event,
receive an installation command to cause a software installation in a managed network via the message bus, and
initiate the software installation via the message bus after the installation event.

12. The system of claim 11, wherein the managed network comprises at least one of a set of hosts or a set of targets.

13. The system of claim 12, wherein the at least one of a set of hosts or a set of targets comprises at least one of a set of virtual machines or a set of hardware-implemented machines.

14. The system of claim 13, wherein the software installation comprises a software installation to a plurality of the hosts or targets in the at least one of a set of hosts or a set of targets.

15. The system of claim 11, wherein the message bus comprises an exchange and a message queue.

16. The system of claim 15, wherein at least one of the deployment server, a set of applications, or a node of the managed network subscribe to the message queue.

17. The system of claim 16, the processor further to generate a message from the deployment server to at least one of the set of applications or node of the managed network indicating a status of an installation process.

18. The system of claim 16, wherein the installation commands are received in view of detected installation events in the managed network.

19. The system of claim 18, wherein the subscription to the message queue is based on a one-to-many configuration.

20. The system of claim 11 wherein the software installation comprises an installation of at least one of an operating system or an application.

21. A non-transitory computer readable storage medium comprising instructions that, in response to execution by a processor, cause the processor to:
establish a message bus between a deployment server and a resource;
monitor the message bus to detect a message with a first installation activity; and
generate, by the processor, an installation command to cause a second installation activity in a managed network, in view of the message detected on the message bus.

22. The non-transitory computer readable storage medium of claim 21, wherein the first installation activity comprises an installation an operating system, and wherein the second installation activity comprises an installation of a set of software applications to the operating system.

* * * * *